Oct. 11, 1960   P. E. ANDERSON ET AL   2,955,394
MACHINE FOR FORMING AND ASSEMBLING PARTS
Filed April 25, 1958   8 Sheets-Sheet 3
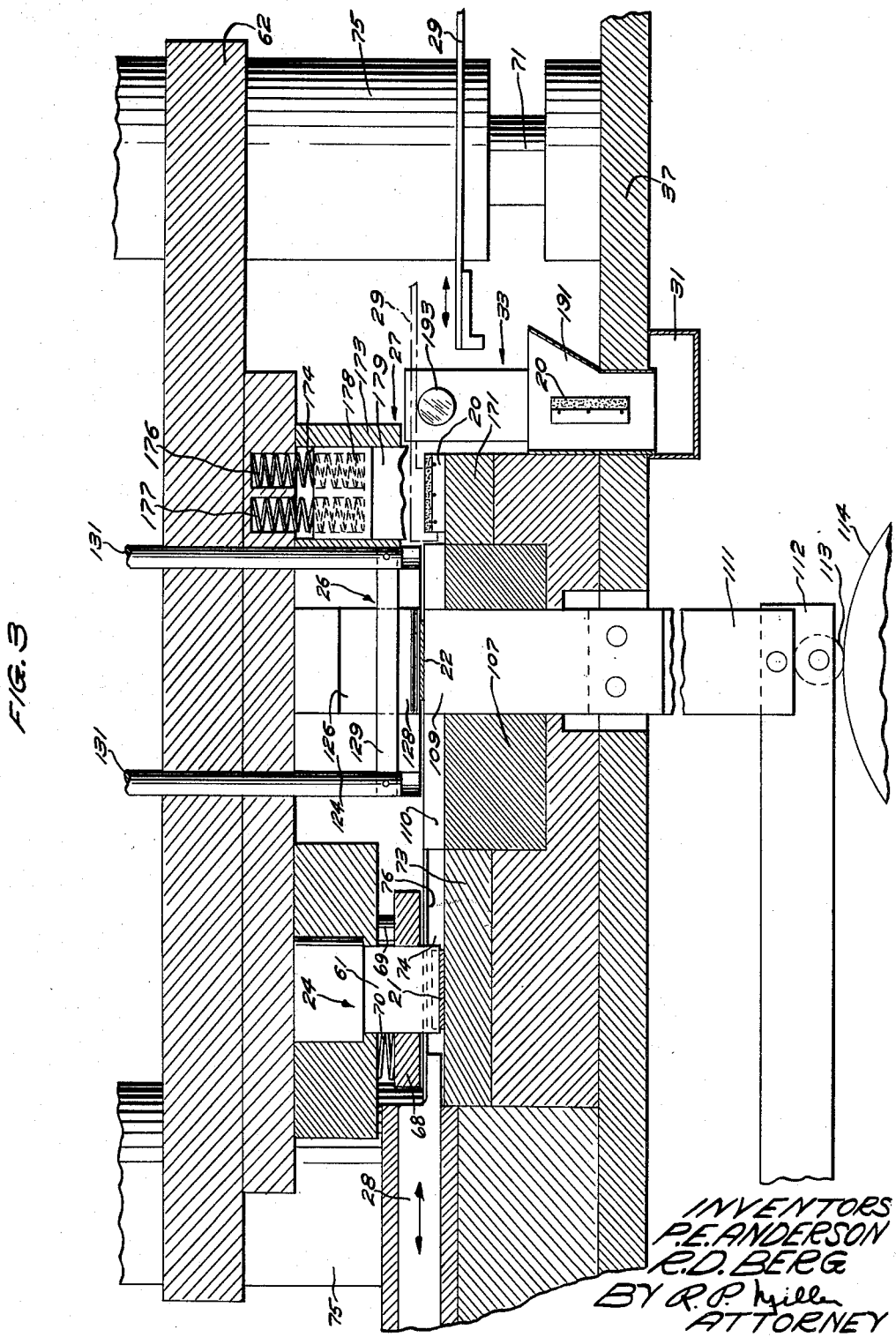

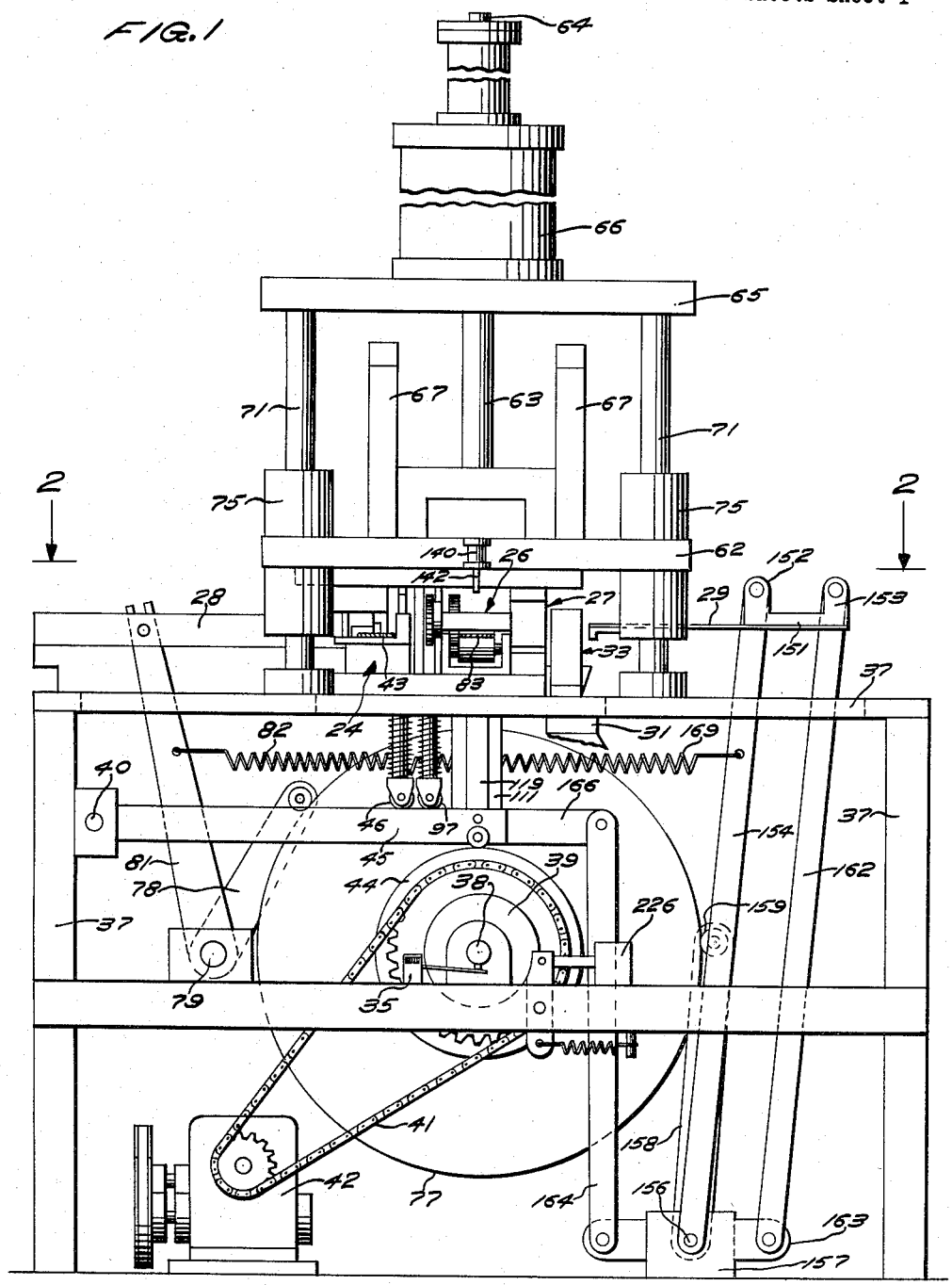

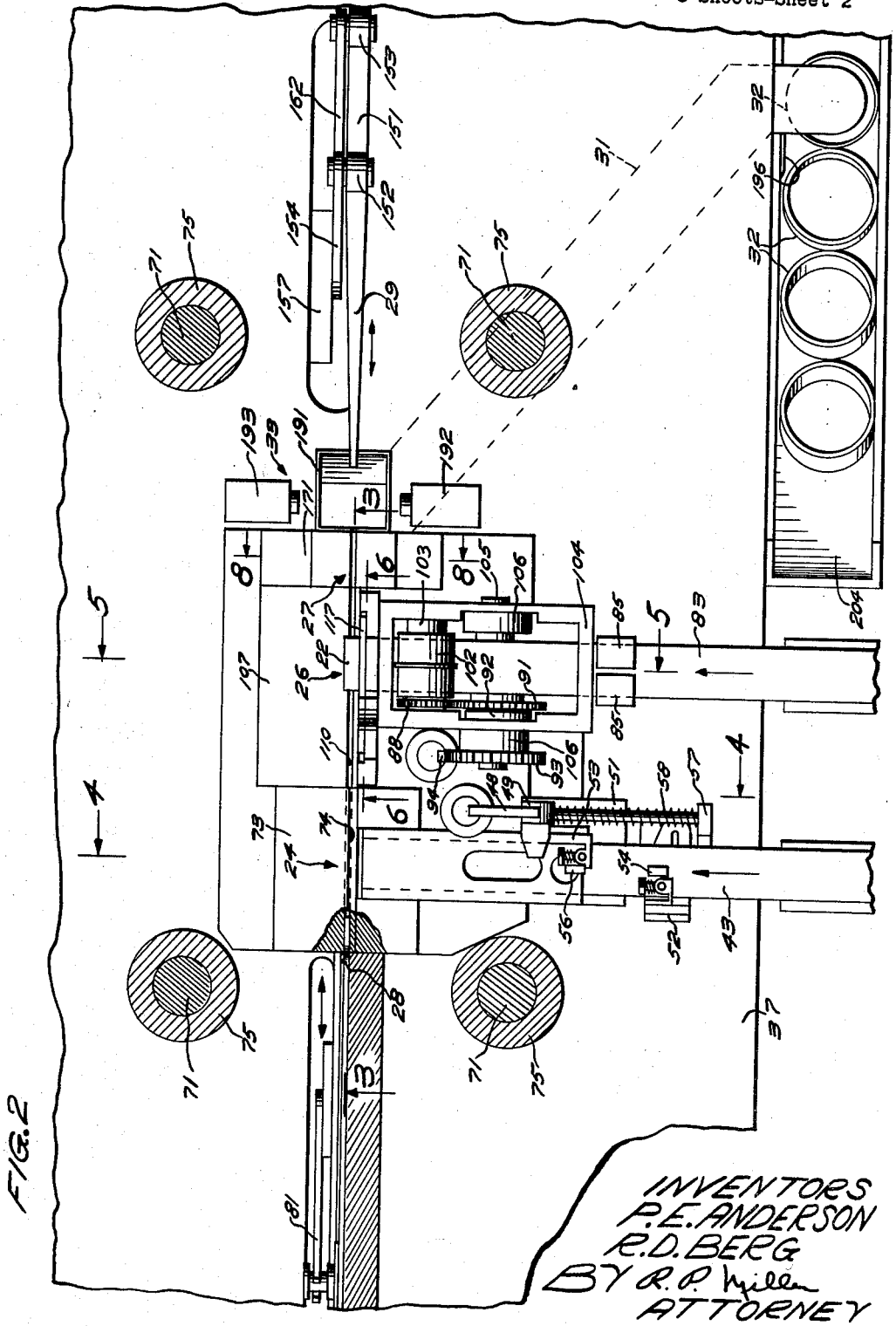

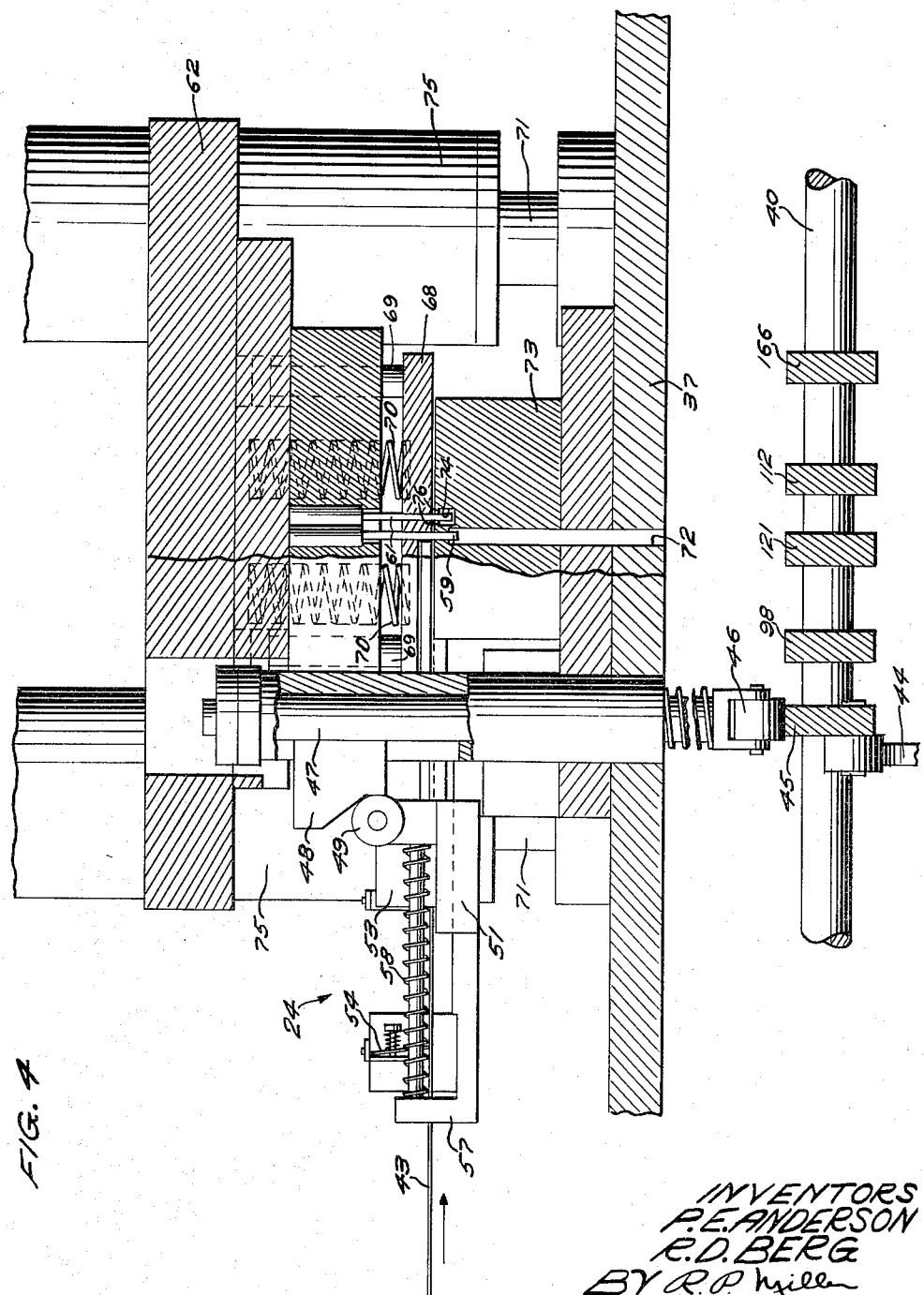

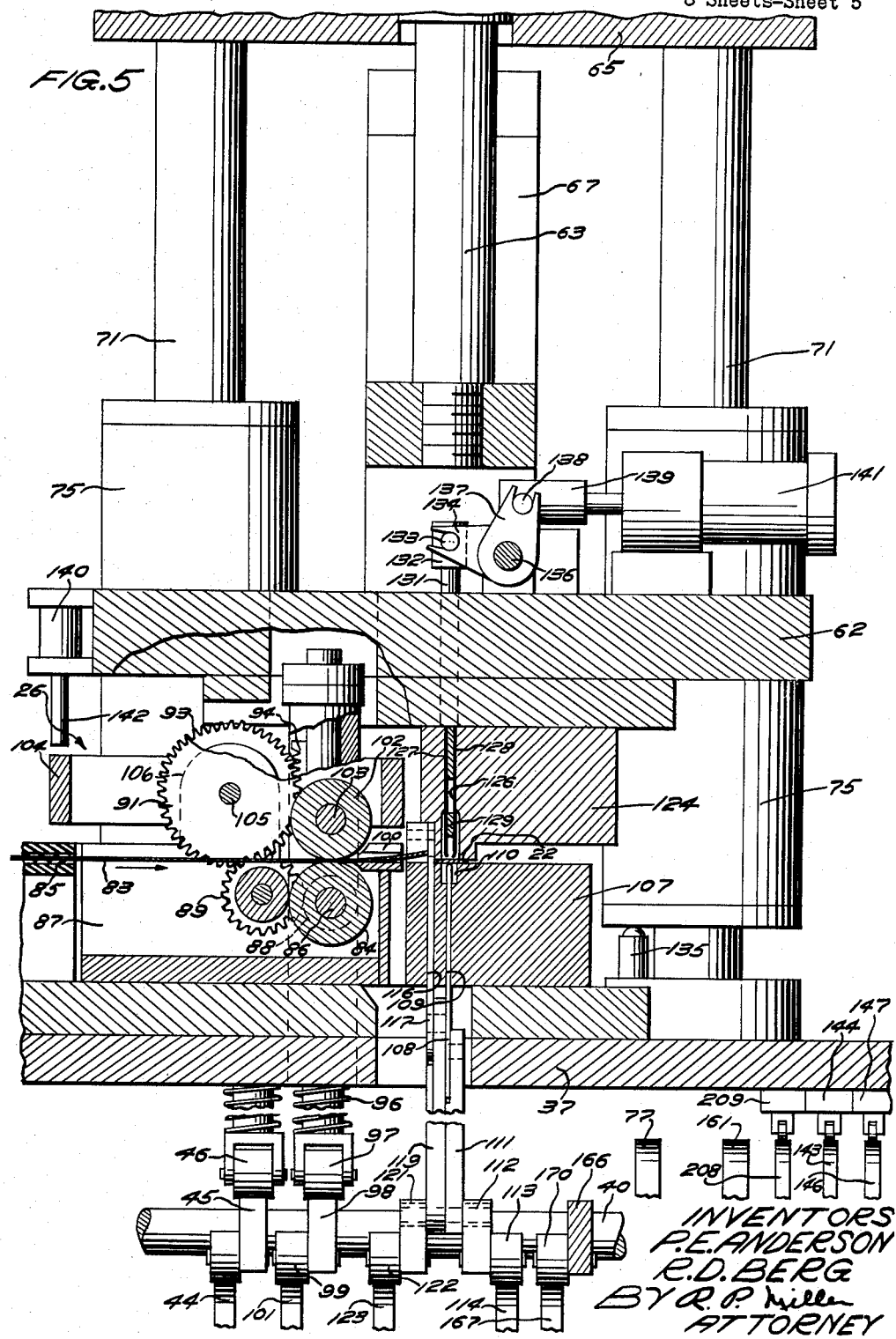

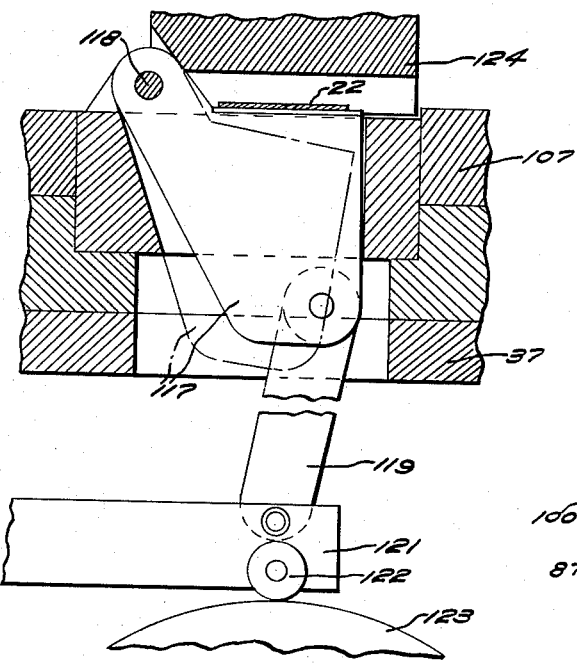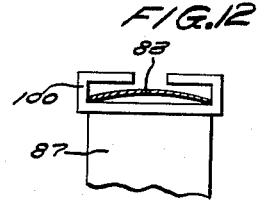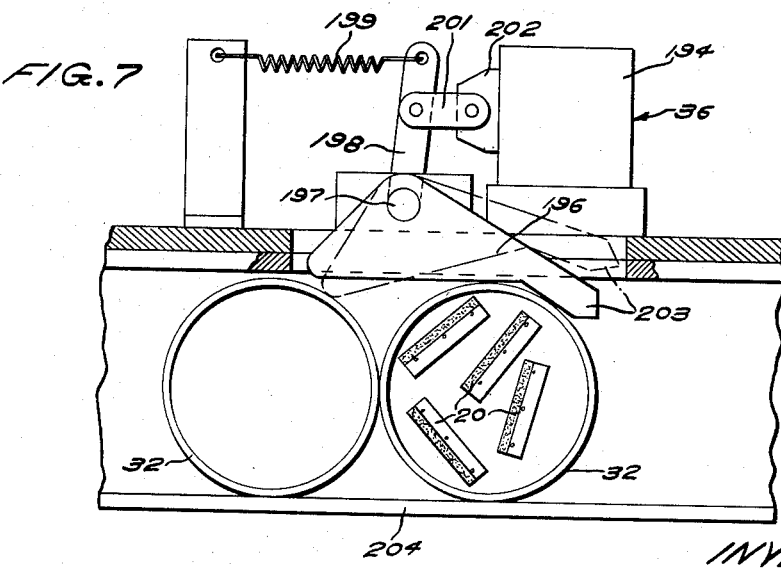

Oct. 11, 1960 P. E. ANDERSON ET AL 2,955,394
MACHINE FOR FORMING AND ASSEMBLING PARTS
Filed April 25, 1958 8 Sheets-Sheet 7
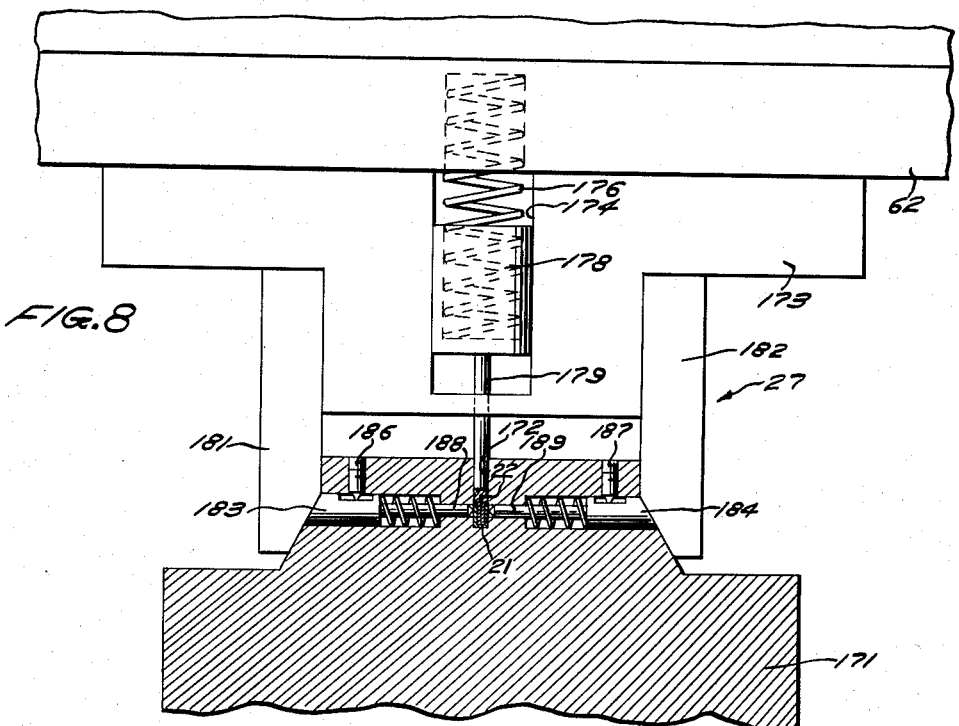
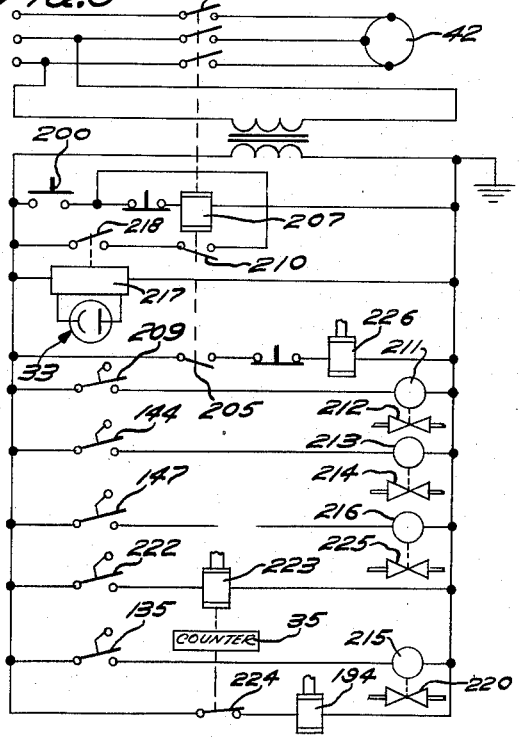
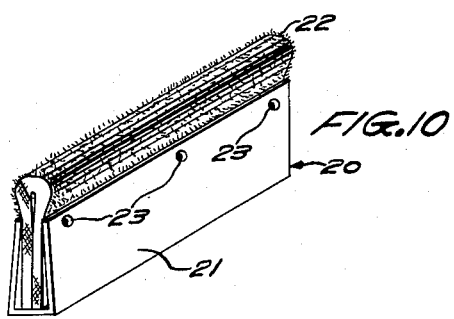
INVENTORS
P.E. ANDERSON
R.D. BERG
BY R.P. Miller
ATTORNEY

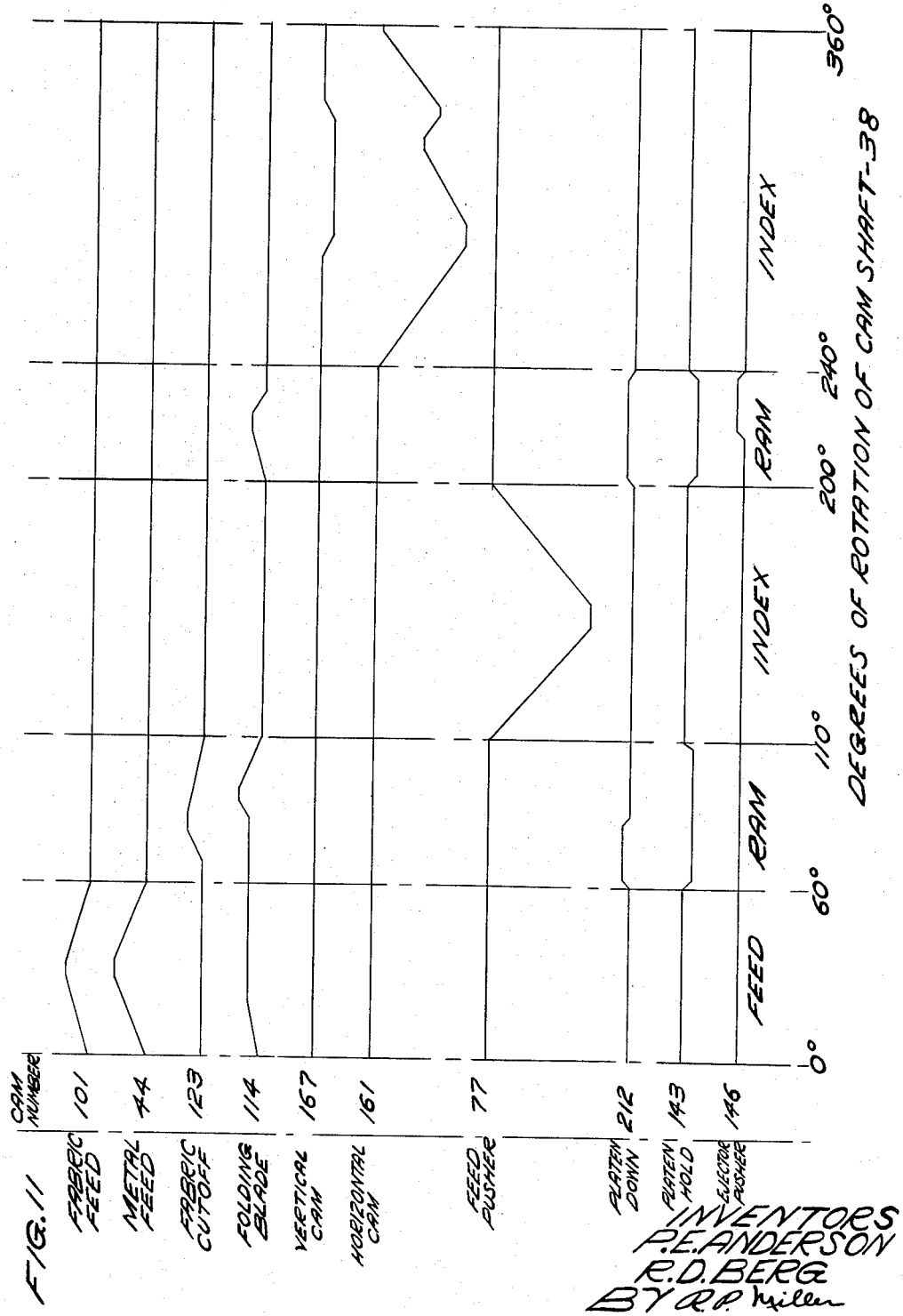

United States Patent Office 2,955,394
Patented Oct. 11, 1960

2,955,394

MACHINE FOR FORMING AND ASSEMBLING PARTS

Paul E. Anderson, Hinsdale, and Richard D. Berg, Westchester, Ill., assignors to Western Electric Company, Incorporated, New York, N.Y., a corporation of New York Filed Apr. 25, 1958, Ser. No. 731,038

16 Claims. (Cl. 53—64)

This invention relates to a machine for forming and assembling parts, and more particularly to a machine for automatically forming a metallic clip and inserting a fabric pad within the clip.

In the fabrication of pads for use in electrical commutators, it is necessary to insert a soft but long-wearing fabric cloth pad into a metallic clip. In order to secure optimum operation, an automatic machine for fabricating such pads should include facilities for simultaneously fabricating the clip and pad and subsequently insert and secure the pad in the clip. It is also desirable to provide facilities for counting the completed pads and loading a suitable receptacle with a predetermined number of said pads.

An object of the invention resides in a new and economical machine for automatically fabricating and subsequently assembling a plurality of components.

Another object of the invention is the provision of a machine for severing and forming from strip materials a pair of components that are subsequently assembled and secured together.

An additional object of the invention resides in a machine including a device for forming a metallic clip that is fed to a second device that functions to form and insert a fabric pad within the clip.

A further object of the invention resides in facilities for counting articles emanating from a fabricating machine and controlling the number of articles advanced to each of a series of suitable receptacles.

A still further object of the invention is the provision of a unique arrangement of pushing and pulling mechanisms that function to sequentially advance components through a series of fabricating devices that operate in conjunction therewith.

With these and other objects in view, the present invention contemplates a machine that automatically and cyclically operates to control facilities that feed and form sections of a metallic strip into a series of U-shaped clips. While each clip is being formed, further facilities are operated to advance, sever and fold short lengths of fabric material into pads. Subsequent to each set of forming operations, instrumentalities are rendered effective to advance the formed clip onto the folded fabric pad whereafter the assembled pad is advanced and staked. Each completed wiper pad is counted and advanced into a suitable receptacle. Upon a predetermined number of pads being advanced into a receptacle, an escapement mechanism is operated to advance a new receptacle in a position to receive subsequent pads.

Other objects and advantages of the present invention will be apparent from the following detailed description when considered in conjunction with the accompanying drawings, wherein Fig. 1 is a front elevational view of a machine for fabricating and assembling metal encased wiper pads in accordance with the principles of the present invention;

Fig. 2 is a top plan view taken along line 2—2 of Fig. 1 particularly illustrating metal and fabric strip stock feed mechanisms;

Fig. 3 is an enlarged sectional view taken along line 3—3 of Fig. 2 depicting a path of advance of components through a series of fabricating mechanisms;

Fig. 4 is an enlarged sectional view taken along line 4—4 of Fig. 2 illustrating a mechainsm for forming a metallic clip;

Fig. 5 is an enlarged sectional view taken along line 5—5 of Fig. 2 illustrating a mechanism for forming a fabric pad and inserting said pad into a metallic clip;

Fig. 6 is an enlarged sectional view taken along line 6—6 of Fig. 2 showing a device for severing lengths of fabric;

Fig. 7 is a top plan view of an escapement device for advancing receptacles that receive the wiper pads fabricated by the machine shown in the other figures;

Fig. 8 is an enlarged sectional view taken along line 8—8 of Fig. 2 illustrating a mechanism for staking an assembled wiper pad;

Fig. 9 is a circuit diagram showing control element for operating the overall machine;

Fig. 10 is a perspective view of a completely fabricated wiper pad;

Fig. 11 is a timing diagram depicting the sequence of operation of each of the component mechanisms with respect to each other, and Fig. 12 is a sectional view taken along line 12—12 of Fig. 5 showing a fabric guide.

GENERAL DESCRIPTION

Referring to Fig. 10, there is shown a wiper pad 20 of the type which the machine embodying the invention is adapted to fabricate. The wiper pad includes a U-shaped metallic clip 21 into which is inserted a folded fabric pad 22. The clip 21 is staked at points 23 to secure the pad within the clip.

The machine shown in Figs. 1–8 includes a clip forming mechanism or station generally designated by the reference numeral 24, a pad forming and inserting mechanism or station generally designated by the reference numeral 26 and a crimping and staking mechanism or station generally designated by the reference numeral 27 together with a feed pusher 28 for advancing the clips 21 from station 24 to station 26. A hook-like member 29 is provided to advance the assembled pad and clip from station 26 to station 27. The advance of a wiper pad 20 to the staking station 27 results in the pushing of a previously staked pad out of the staking station and into a discharge chute 31, which guides the pad into a suitable circular-shaped receiving receptacle 32.

A photoelectrically controlled device generally designated by the reference numeral 33 ascertains the production of a completed wiper pad during each cycle of operation of the machine. If a wiper pad is not produced which indicates failure of one of the component mechanisms, then facilities are operated to interrupt further cyclicaling of the machine.

A counter mechanism 35 counts the number of complete cycles of the machine and the completed pads advanced to each receptacle 32 and upon a predetermined number of pads being advanced, an escapement device, generally denoted by the reference numeral 36 and shown in Fig. 7 is operated to permit the advance of another receptacle 32 into position to receive the pads advanced down the chute 31. The entire machine is mounted on a frame 37. The sequence of operation of the various component mechanisms is controlled by a series of cams mounted on a shaft 38 that operate on cam follower levers pivotally mounted on a rod 40. The shaft is driven through a clutch 39 by a sprocket and chain arrangement 41 that is driven by a suitable motor 42.

Clip severing and forming mechanism

Referring now to Figs. 2, 3 and 4, a metallic strip 43 is advanced into the clip forming mechanism 24. A cam 44 presents a depression to a cam follower lever 45 pivotally mounted on rod 40 that controls a spring-loaded follower 46 attached to a slide rod 47. A cam abutment 48 fixed to the rod 47 is adapted to operate on a cam follower roller 49 to move a slide 51 toward the left as viewed in Fig. 4. Slide 51 has a pair of brackets 52 and 53 attached thereto which provide mountings for a pair of spring-biased feed fingers 54 and 56. A bracket 57 secured to the frame 37 provides a support for a spring 58 that urges the slide 51 to move the cam follower roller 49 into engagement with the abutment cam 48. When the cam 48 is moved downwardly, slide 51 advances toward the left and the fingers 54 and 56 ride over the upper surface of the metallic strip 43.

Upon presentment of a high portion of the cam 44 to move the follower 46, the rod 47 and abutment cam 48 move upwardly thereby permitting the cam follower roller 49 to move toward the right under urging of the spring 58. The slide 51 thereby moves toward the right and the fingers 54 and 56 are spring-urged into contact with the metal strip 43 to advance the strip toward the right into alignment with a shearing punch 59 and a forming member 61. The punch 59 and the forming member 61 are attached to a platen 62 that is normally in an elevated position when the strip 43 is advanced.

Referring again to Fig. 1, it will be noted that the platen 62 is attached by a rod 63 and a piston 64 within an air cylinder 66. A series of rubber-tipped bumpers 67 are provided to limit upward movement of the platen 62. A pressure pad 68 is mounted by headed stud shafts 69 onto the platen 62. Springs 70 (see Fig. 4) urge the pressure pad 68 in a downwadrly extending direction. A series of guide rods 71 are attached to a support plate 65 and slidably extend through guide cylinders 75 attached to the platen 62 to insure the translatory movement of the platen.

When the air cylinder 66 is operated, the rod 63 moves downwardly to advance the platen 62, and as a consequence, the pressure pad 68 moves into engagement with the advanced metallic strip 43. The pressure pad 68 holds the metallic strip 43 while the punch 59 is advanced to sever a small section of the strip which drops out of the machine through a channel 72. A forming anvil 73 is provided to cooperate with the punch 59, and it is through this anvil that the channel 72 is formed. Anvil 73 is also provided with a recess 74 that is shaped to provide a pair of spaced lips 76. The forming member 61 engages and advances the severed section of strip between the lips 76 to form said severed strip into a U-shaped clip. When the air is removed from the cylinder 66 to withdraw the platen 62, the forming member 61 is withdrawn from within the recess 74 but the formed clip is retained therein due to the action of the lips 76 engaging the upper edges of the clip.

When the clip has been completely formed and the air cylinder 66 withdraws the forming member 61, a cam 77 (see Fig. 1) is rendered effective to move a cam follower 78 in a clockwise direction. Cam follower 78 is connected by a stud shaft 79 to a lever 81 that is pinned to the pusher 28. A spring 82 is connected to the lever 81 to insure that the cam follower 78 follows the contour of the cam 77. Referring to Figs. 2 and 3, the advance of the pusher 28 results in an advance of the formed clip to the pad forming and inserting station 26.

Pad forming and inserting mechanism

Referring now to Figs. 2, 3, 5 and 6, the details of the pad forming and inserting mechanism will be described. A fabric strip 83 is advanced by a feed roller 84 that is rotatably mounted through the agency of a shaft 86 in a frame 87. A pair of electrically heated singe elements 85 are located to burn off frayed edges of the fabric material 83. The frame 87 is mounted on the frame 37. Shaft 86 is connected to a gear 88 meshing with a gear 89 that meshes with a gear 91 which is connected through a one-way clutch 92 to a gear 93 meshing with a rack 94. Rack 94 is urged downwardly by a spring 96 and has attached thereto a roller 97 that engages a lever 98 pivotally mounted on the pivot rod 40. Lever 98 has a roller 99 rotatably mounted thereon to cooperate with a cam 101.

A circumferentially ridged roller 102 mounted on a shaft 103 urges the fabric 83 into engagement with the feed roller 84. The shaft 103 is mounted in a frame 104 that in turn is mounted by a shaft 105 between a pair of stanchions 106 extending upwardly from the frame 87. The roller 102 and the shaft 103 are mounted forwardly of the shaft 105; consequently, through the agency of gravity or springs the roller 102 is urged into engagement with the fabric 83.

When the cam 101 presents a low portion to the follower 99, the lever 98 is pivoted about the rod 40 to permit the spring 96 to move the roller 97 and the rack 94 in a downward direction. Rack 94, through the agency of gear 93, one-way clutch 92 and gears 91, 89 and 88, rotates the roller 84 to advance a section of the fabric 83 through a yoke guide 100 onto a block 107. As shown in Fig. 12 the yoke guide 100 is narrower than the width of fabric 83; thus, the fabric is bowed and centered as it passes through the guide. Block 107 is provided with a channel 110 that is a continuation of the recess 74, shown in Fig. 4. A tucking blade 108 extends up through a slot 109 formed in the block 107 so that the end projects up into alignment with the top surface of the block 107 thereby providing a means for precluding the advancing fabric 83 from moving into the channel 110. Blade 108 is attached to a slide bar 111 that is pivotally attached to a lever 112 mounted on the pivot rod 40. Lever 112 has a cam follower roller 113 secured to the free end thereof to cooperate with a cam 114.

A second slot 116 is formed in the block 107 to accommodate a severing blade 117 pivotally mounted about a stud shaft 118 (see Fig. 6). There is pivotally attached to the lower portion of the severing blade 117 a link 119 that is pivotally attached at its other end to a lever 121 that is rotatably mounted on the rod 40. The free end of the lever 121 has a cam follower roller 122 that cooperates with a cam 123.

Platen 62 has secured thereto a holddown block 124 with a recess 126 formed therein to accommodate a pair of resilient holder blades 127 and 128 that extend down into an enlarged portion of the recess. Between the blades 127 and 128 there is slidably mounted an ejector pusher 129 that is attached to a pair of slide rods 131 extending through apertures formed in the platen 62. Secured to the upper extremity of the rods 131 is a pair of collars 132 having a pin 133 extending therethrough and into bifurcations formed on a lever 134 that is attached to a stud shaft 136. This shaft has secured thereto a second lever 137 that is bifurcated at its free extremity to accommodate a pin 138 extending from a piston rod 139 that rides within an air cylinder 141 mounted on the platen 62.

When the block 124 moves into engagement with the advanced fabric 83, the cam 123 is rendered effective to present a lobe to the cam follower roller 122 thereby pivoting the lever 121 and the link 119 in an upwardly direction. Link 119 moves the severing blade 117 to cut the advanced section of fabric 83. Coincident with the advance and severing of a predetermined length of fabric 83, the platen 62 operates a limit switch 135 to energize a control circuit that functions to control the admission of air to a cylinder 140 to move a rod 142 into engagement with the rear portion of the frame 104.

Inasmuch as frame 104 is pivotally mounted, this frame pivots to move the roller 102 from engagement with the fabric 83. The release of the fabric 83 permits the bowed section of fabric to center itself in the yoke guide 100.

Following severing of the fabric 83, a cam 143 operates a switch 144 that functions to operate a control circuit that reduces the air pressure applied to the air cylinder 66 whereupon the platen 62 and block 124 are slightly withdrawn partly relieving the pressure applied to the severed section of fabric 83. The cam 114 is now rendered effective to present a lobed portion to the cam follower roller 113 that functions to pivot the lever 112 and move the bar 111 upwardly to move the blade 108 into engagement with the severed section of the fabric 83 whereby said severed section of fabric is folded and advanced between the blades 126 and 127. The cam 114 now presents a low portion to the cam follower roller 113 whereupon the top of the blade 108 is withdrawn to the bottom of the recess 110. The tucked fabric 83 is now retained between the blades 127 and 128 due to the inturned ends of the blades precluding withdrawal of the fabric with the blade 108.

The cam 77 (see Fig. 1) is now rendered effective to present a low portion to the cam follower 78 whereupon the shaft 79 and the lever 81 are pivoted in a clockwise direction to advance the pusher 28. The pusher 28 moves a formed U-shaped clip 21 into the channel 110, the blade 108 being fully withdrawn at this time to permit the positioning of the clip in register with the resilient blades 127 and 128. The cam 114 is then again rendered effective to pivot the cam follower roller 113 and the lever 112 to advance the bar 111 and the blade 108 so that the blade moves the clip over the outer surfaces of the resilient blades 127 and 128. Next, a cam 146 operates a switch 147 to energize a control circuit associated with the air cylinder 141. Air is admitted to cylinder 141 thereby moving the piston rod 139 to pivot the lever 137, the shaft 136 and the lever 134 whereupon the pin 133, the collars 132, the rods 131 and the pusher 129 are moved downwardly. The pusher 129 acts on the folded fabric to move the fabric from between the blades 127 and 128; thus, moving both the fabric and the clip from the blades 127 and 128. The assembled clip 21 and fabric 22 are now positioned within the channel 107 in anticipation of being advanced to the staking mechanism 27.

*Hook feed and staking mechanism*

The hook feed mechanism is more clearly shown in Fig. 1 and as previously indicated consists of a hook-like member 29 that is mounted on a bar 151 having a pair of projections 152 and 153. Projection 152 is pivotally attached to a lever 154 which is pivotally connected to a shaft 156 that is mounted in a yoke 157 attached to the frame 37. Shaft 156 has secured thereto a lever 158 on which is mounted a cam follower roller 159 adapted to ride on the surface of a horizontal advance cam 161, only a portion of which is illustrated in Fig. 5.

Projection 153 is pivotally connected to a lever 162 that is pinned at its lower extremity to a pivot bar 163 mounted within the yoke 157. The other end of the pivot bar 163 has attached thereto a link 164 that is attached to a lever 166 pivotally mounted about the rod 40. Lever 166 has a cam follower 170 mounted thereon adapted to follow the contour of a vertical advance cam 167. A spring 169 is connected to the lever 154 to urge the cam follower roller 159 into engagement with the cam 161.

In operation of the hook feed mechanism, the cam 167 pivots the lever 166 upwardly thereby moving the link 164 to pivot the bar 163 in a clockwise direction. Lever 162 thereby moves downwardly to pivot the short bar 151 about the upper extremity of the lever 154. The hook bar 29 therefor pivots to move the hook extremity in an upwardly direction. The cam 161 is rendered effective to permit the cam follower roller 159 to move toward the left whereupon the lever 158 pivots the shaft 156 to move the lever 154 toward the left under the urging of the extended tension spring 169. The bar 151 and the hook-like member 29 now move to the left to position the hook extremity behind the assembled clip 21 and folded fabric 22. Cam 167 now presents a low portion to the follower 170 on the lever 166 whereupon link 164, pivot bar 163, lever 162 and short bar 151 move to pivot the hook-like extremity of the member 29 behind the assembled clip. The cam 161 then moves the cam follower roller 159 to impart movement to the lever 158, the pivot shaft 156, the lever 154 and the short bar 151 to withdraw the hook-like member 29 toward the right to advance the clip within the crimping and staking mechanism 27.

Referring now to Fig. 8, the assembled clip 21 and the fabric fold 22 are shown in the crimping mechanism 27. The staking mechanism 27 comprises a block 171 having an elongated channel 172 through which the hook-like member 29 advances the clip 21. Attached to the platen 62 is a block 173 provided with a recess 174 that accommodates a pair of springs 176 and 177 (see Fig. 3) that extend up into bores formed in a section of the platen 62. A recessed slide 178 is positioned within the recess 174 to receive the springs 176 and 177. Extending from the lower portion of the slide 178 is a holddown blade 179 that is adapted to engage and hold the fabric 22 during a staking operation.

Attached to the block 173 is a pair of bar cams 181 and 182 that cooperate with two sets of three spring-urged followers 183 and 184. Cam followers 183 and 184 are each provided with an elongated slot into which projects a series of set screws 186 and 187 to limit movement of the cam followers. A set of three staking punches 188 are individually attached to the cam followers 183 and a second set of three staking punches 189 are connected to the cam followers 184.

When the platen 62 moves downwardly, the blade 179 is moved into engagement with the fabric 22 to hold the fabric within the clip 21 during the subsequent staking operation. Further movement of the platen 62 results in the cams 181 and 182 acting on the sets of cam followers 183 and 184 to drive sets of punches 188 and 189 into opposite sides of the clip 21. The punches 188 and 189 function to form oppositely disposed indentations at points 23 and crimp the edges of the clip into the fabric 22.

*Receiving receptacle mechanism*

As each clip 21 and fabric fold 22 is advanced to the staking mechanism 27, a completed wiper pad 20 (see Fig. 3) is moved into a discharge hopper 191 leading to the discharge chute 31. The completed wiper pad falls into a receptacle 32. Associated with the discharge hopper 191 is a photoelectric device comprising a photocell 192 and a light source 193 that function to ascertain each wiper pad 20 falling into the hopper 191. Associated with the photocell 192 is a timing circuit that functions to interrupt the operation of the machine if a wiper pad 20 is not ascertained during a predetermined period of time which is indicative of the time normally required for the machine to properly function.

The counter 35 actuated by an actuator 195 extending from the shaft 38 counts each rotation of the cam shaft and hence counts each cycle of operation of the overall machine. After a predetermined number of operations of the counter, the counter functions to interrupt an energizing circuit for a solenoid 194 that controls the operation of the escapement device 36. The escapement device 36 comprises a triangular shaped blade 196 that is attached to a stud shaft 197. A lever 198 is secured at one end to the stud shaft 197 and has attached to the opposite end a spring 199. A link 201 is attached at one end to the lever 198 and at the other end to an armature 202 of the solenoid 194.

When the solenoid 194 is deenergized, the armature 202 is thrust toward the left under the urging of the spring 199 thereby moving the link 201 to pivot the lever 198 in a clockwise direction. Lever 198 moves the stud shaft 197 to pivot the triangular shaped blade 196 so that a holding projection 203 moves from engagement with the receptacle 32. The receptacles 32 are mounted in an inclined guideway 204; consequently, the leading full receptacle 32 is moved from without the escapement device 36. One corner of the triangular shaped blade 196 is moved into engagement with the next succeeding receptacle 32 to hold said receptacle against the action of gravity until such time as the solenoid 194 is energized. When the solenoid 194 is energized, the triangular blade 196 is restored to the position shown in Fig. 7 whereupon the empty receptacle 32 moves into position to receive completed wiper pads being advanced down the chute 31.

*Control circuit and overall operation*

With particular reference to Figs. 9 and 11, the operation of the overall machine will briefly be reviewed. The momentary depression of a start button 200 completes an obvious circuit for a relay 206 that functions to draw up contacts 207 to energize a power circuit for the drive motor 42, the cam shaft 38 starts to rotate and during the first sixty degrees of rotation, the metal 43 and the fabric 83 are advanced by action of the cams 44 and 101. Relay 207 also draws up a contact 210 that completes a locking circuit around the start button. In addition relay 207 closes contacts 205 to complete an energizing cricuit running to a clutch solenoid 226 that functions to release clutch 39, thereby permitting the motor 42 to impart rotation to the cam shaft 38.

Next, a cam 208 (see Figs. 5 and 9) is rendered effective to operate a switch 209 that functions to energize a solenoid 211. Solenoid 211 operates an air valve 212 to admit air to the cylinder 66 whereupon the piston 64 and the platen 62 move downwardly causing the gripping of both the metal strip 43 and the fabric 83. The cam 123 now actuates the mechanism associated therewith to sever the cloth. In the downward position the platen 62 opens the switch 135 to complete an energizing circuit for a solenoid 215 that functions to operate a valve 220 to admit air to the cylinder 140. The piston rod 139 within the cylinder 140 moves the rod 142 down to pivot the frame 104 to withdraw the pressure roller 102 while the fabric 83 is being severed. The downward movement of the platen 62 is also effective to sever and form the metal clip 21.

Just prior to the operation of the cam 114, the cam 208 releases the switch 209. However, the cam 143 has already operated the switch 144 so that a solenoid 213 is operated to actuate a valve 214 to supply the air pressure to the cylinder 66 at a reduced pressure. This action partially releases the advanced fabric 83 to permit the blade 108 to advance the severed fabric within the blades 127 and 128.

At 110° rotation of the shaft 38, the cam 77 is rendered effective to operate the feed pusher 28 to advance or index the clip 21 into alignment with the blades 127 and 128. While the cam 77 is operating the feed pusher 28, the cam 114 fully withdraws the blade 108 from the channel 110. As soon as the clip 21 is advanced, at a 200° revolution of the shaft 38, the switch 213 is again closed to energize the solenoid 214 whereupon the platen 62 is moved downwardly. The cam 114 is again rendered effective to advance the blade 108 to push the clip 21 onto the blades 127 and 128. The cam 146 now functions to close the switch 147 that operates a solenoid 216 which functions to operate a valve 225 to admit air to the cylinder 141. Air cylinder 141 operates to move the ejector pusher 129 to advance the assembled clip 21 and fabric pad 22 back into the channel 107.

The horizontal cam 161 is now rendered effective to move the hook-like member 29 beyond the assembled wiper pad 20. The cam 167 then functions to move the hook down behind the assembled wiper pad 20. The cam 161 then moves the hook-like member 29 to the right to move the index wiper pad 20 in the staking station. Cam 161 slightly moves the hook-like member 29 toward the left and the cam 167 functions to lift the hook-like member whereafter the cam 161 moves the hook-like member back to the initial unoperated position. The wiper pad 20 is crimped and staked upon the next downward movement of the platen 62.

As the wiper pad 20 is advanced to the staking station 27, a completely fabricated pad is pushed into the hopper 191 to actuate the photocell 33. Each operation of the photocell is registered on a timer 217 and if the timer is not operated within a predetermined period of time indicative of a successful cycle of operation, the timer opens normally closed contacts 218 connected in a locking circuit connected around the start button 200.

Each time the shaft 38 completes a revolution indicative of a complete cycle of operation of the entire machine, a projection 219 on the shaft strikes an arm 221 to close a switch 222 that momentarily operates a solenoid 223 contained within the counter 35. After a predetermined number of actuations of the counter, the counter opens a normally closed contact 224 to interrupt the energizing circuit for the solenoid 194 whereupon the escapement mechanism 36 is operated to permit the filled receptacle 32 to move down the enclosed guideway 204 and an empty receptacle moves into position to receive the subsequently produced wiper pads 20.

It is to be understood that the above-described arrangements of apparatus and construction of elemental parts are simply illustrative of an application of the principles of the invention and many other modifications may be made without departing from the invention.

What is claimed is:

1. In an automatic fabricating machine, a pair of blades resiliently mounted in spaced parallel planes, means for advancing a length of material between the inner face of each of said blades, means for advancing a metallic clip upwardly into engagement with the outer face of each of said blades, and means for ejecting the material from within the blades to move the clip from the blades and insert the material within the clip.

2. In an automatic assembling machine, means for holding a length of strip material, means for advancing and folding a length of strip material within the holding means, means for advancing a U-shaped clip into alignment with the outer surface of said holding means, means for advancing the U-shaped clip upwardly into engagement with the outer surface of said holding means, and means for ejecting the folded material from within said holding means to remove said clip from engagement with said holding means and simultaneously position said folded material within the clip.

3. In a machine for assembling a folded fabric within a metallic clip, means for advancing a section of fabric strip, means for severing said advanced fabric strip, a pair of spaced resilient blades, means for advancing and folding said severed fabric strips into engagement with the inner face of each of said resilient blades, means for advancing a metallic clip upwardly into engagement with the outer surface of said blades, a pusher mounted for movement between said blades, and means for moving said pusher downwardly to engage and eject said folded fabric within the clip.

4. In an automatic fabricating machine, a pair of spaced holder blades, an insert blade mounted beneath the holder blades for movement in a first direction between the blades, a pusher mounted for movement between the blades in a direction opposite to that of the insert member, cyclically operable means, means operated by the cyclically operable means for operating the insert blade to advance a length of material between said holder blades, means for advancing a U-shaped clip into alignment with said holder blades and above said insert member, means operated by the cyclically operated means for operating the insert blade a second time to advance a position clip onto the holder blades, and means operated by the cyclically operable means for moving said pusher to engage and eject the held material within the clip.

5. In a machine for assembling a length of strip material within a clip, the combination of means for feeding metallic strip, means for severing and forming clips from the advanced strip material, means for simultaneously advancing a strip of fabric, means for severing the advanced fabric strip, a holder means, means for inserting the severed fabric strip within the holder, means for advancing the clip into alignment with the holder means, means for operating the inserting means to advance the clip onto the holder means, and means for ejecting the fabric strip from the holder means whereby the fabric moves within the clip to move the clip from the holder means.

6. In an automatic assembling machine for inserting a first part within a second part having an open end, a pair of resilient blades, an inserting member, means for operating said inserting member to advance a first part between said blades, means for advancing a second part into position to present the open end to said blades, means for operating said inserting means a second time to advance the open end of said second part about the blades, and means movable between said blades for ejecting the first part to move within the second part to move both said parts from the blades.

7. In an automatic machine for assembling a clip on a length of strip material, a cyclically operable control means, a pair of spaced holder members, an inserting blade spaced from the holder members, means operated by the cyclically operable control means for periodically advancing a length of strip material between the holder members and the inserting blade, means for severing said strip material, means operated by the cyclically operable control means for moving the inserting blade between the holding member to advance said severed length of strip material, means for advancing a clip onto the holder member, a pusher mounted for movement between said holder member, and means operated by the cyclically operated control means for moving the pusher to eject the length of strip material into the clip.

8. In an automatic machine for fabricating and assembling a fabric pad within a metallic clip, the combination of means for advancing a length of metallic material, a platen, means for moving the platen toward the advanced metallic material, means on the platen for severing and forming the advanced material into a U-shaped clip, means for advancing a length of fabric strip, means for severing a length of fabric material, a holder mounted on the platen, means for inserting the severed fabric strip within the holder, means for advancing the clip into alignment with the holder, means for operating the inserting means a second time to advance the clip onto the holder, and means for ejecting the fabric strip from the holder to move the clip from the holder.

9. In a machine for fabricating and assembling a metallic clip and fabric fold, means for advancing a predetermined length of metallic strip, means for advancing a predetermined length of fabric strip, a cyclically operating cam means for simultaneously operating said metallic strip advancing means and said fabric strip advancing means, a ram having metal severing and clip forming means thereon and fabric holding means, means operated by the cam means for operating the ram to sever and clip from the advanced metallic strip, means operated by the cam means for severing the advanced fabric strip, means for folding the severed fabric strip within the holding means, means operated by the cam means for advancing the formed clip about the held folded fabric strip, and means for moving the fabric strip from the holding means to insert said fabric strip within the clip.

10. In a machine for assembling a section of strip material within a clip, a ram, means for feeding a first strip of material beneath the ram, means on the ram for severing and forming the first strip of material into a clip, means for moving the ram to operate the severing and forming means, means for feeding a second strip of material beneath the ram, holding means on the ram, means for severing the second strip of material, means for advancing the second severed strip of material into the holding means, means for moving the formed clip onto the holding means, means for ejecting the second strip of material from the holding means to insert said second strip of material within the clip, a staking mechanism, means for advancing the assembled clip and second strip of material into the staking mechanism, and means operated by the movement of the ram for operating said staking mechanism.

11. In an apparatus for inserting a length of material within a clip, an inserting member, a pair of resilient fingers positioned to span said inserting member, means for advancing a predetermined length of material between the inserting member and the resilient fingers, means for advancing the inserting member to tuck the material between said said fingers, means for advancing a U-shaped clip into position to present the open end to the resilient fingers, means for operating the inserting member to move the clip onto the resilient fingers, and means operatable between said resilient fingers for moving the material and clip from the fingers.

12. In a machine for forming and assembling a length of fabric within a metallic clip, a reciprocating ram, means for advancing a length of metallic strip material beneath the ram, means on the ram for severing and forming said advanced metallic strip material into a clip, means for advancing a length of fabric beneath the ram, means on the ram for gripping said advanced fabric, means for severing the gripped fabric, a pair of resilient blades on the ram and positioned above the gripped fabric, means for moving the ram to release the gripped fabric, means for inserting the released fabric between the blades, means for advancing the clip into alignment with the blades, means for operating the inserting means a second time to advance the clip onto the blades, and means for ejecting the fabric to move the clip from the blades whereby the fabric is inserted within the clip.

13. In a machine for assembling a fabric strip within a metallic clip, means for advancing a length of fabric strip, a holding means, means for severing and inserting the advanced fabric strip within the holding means, means for advancing a clip onto the holding means, means for ejecting the strip from the holding means into the clip, a staking mechanism, a hook-like member, means for advancing the hook-like member over and behind the assembled clip and fabric, means for reversing the direction of movement of the hook-like member to move the assembled clip and fabric into the staking mechanism, and means for operating the staking mechanism to stake the advanced clip.

14. In a cyclically operating machine for assembling clips and lengths of fabric, a holder, means for cyclically advancing a length of fabric within the holder, means for cyclically advancing clips onto the holder, means for ejecting each length of fabric from the holder into a clip, a hook-like member, means for advancing the hook-like member over and behind the assembled clip and fabric, a series of receiving receptacles, means for reversing the direction of movement of the hook-like member to move the assembled clip and fabric into a leading receptacle, means for advancing the receptacles to present each succeeding receptacle to receive the assembled clips and lengths of fabric, means for counting each operation of the overall machine, and means operated by the counter ascertaining a predetermined number of cyclic operations of the machine for operating the receptacle advancing means.

15. In a machine for assembling clips and lengths of fabric, a holder, means for feeding a length of fabric within the holder, means for advancing a clip onto the holder, means for ejecting said fabric within said clip, a hook-like member, means for moving the hook-like member over and behind the ejected clip and fabric, an inclined guideway for a series of receptacles, an escapement mechanism for controlling the movement of the receptacles down the guideway, means for reversing the direction of movement of the hook-like member to move the ejected clip and length of fabric into a leading receptacle, means for cyclically operating the aforesaid means to produce and feed a succession of assembled clips and lengths of fabric to the leading receptacle, a counter cyclically operated by said cyclically operated means, and means operated by a predetermined number of operations of said counter for operating said escapement mechanism.

16. In a machine for assembling a fabric strip within a metallic clip, a pair of blades resiliently mounted in spaced parallel planes, means for advancing a length of material between the inner face of each of said blades, means for advancing a clip upwardly into engagement with the outer face of each of said blades, means for ejecting the material from within the blades into the clip, a staking mechanism, a hook-like member, means for advancing the hook-like member over and behind the assembled clip and fabric, means for reversing the direction of movement of the hook-like member to move the assembled clip and fabric into the staking mechanism, means for operating the staking mechanism to stake the advanced clip, a series of receiving receptacles, means cooperable with said reversing means for advancing each staked clip and fabric into a leading receptacle, means for advancing the receptacles to present each succeeding receptacle to receive the staked clips and lengths of fabric, a counter, means for cyclically operating said counter in accordance with operations of said hook-like member, and means operated by a predetermined number of operations of said counter for operating the receptacle advancing means.

References Cited in the file of this patent

UNITED STATES PATENTS

| | | |
|---|---|---|
| 1,109,023 | Stilwell | Sept. 1, 1914 |
| 1,832,524 | Bosley | Nov. 17, 1931 |
| 1,888,843 | Anderson | Nov. 22, 1932 |
| 1,925,522 | Chiger | Sept. 5, 1933 |
| 2,540,489 | Pretzer | Feb. 6, 1951 |
| 2,632,588 | Hoar | Mar. 24, 1953 |
| 2,693,235 | Kenworthy et al. | Nov. 2, 1954 |
| 2,713,449 | Carmichael | July 19, 1955 |
| 2,724,224 | Downey | Nov. 22, 1955 |
| 2,792,031 | Batchelder | May 14, 1957 |